(No Model.)   B. G. LUTHER.   2 Sheets—Sheet 2.
SAWING MACHINE.

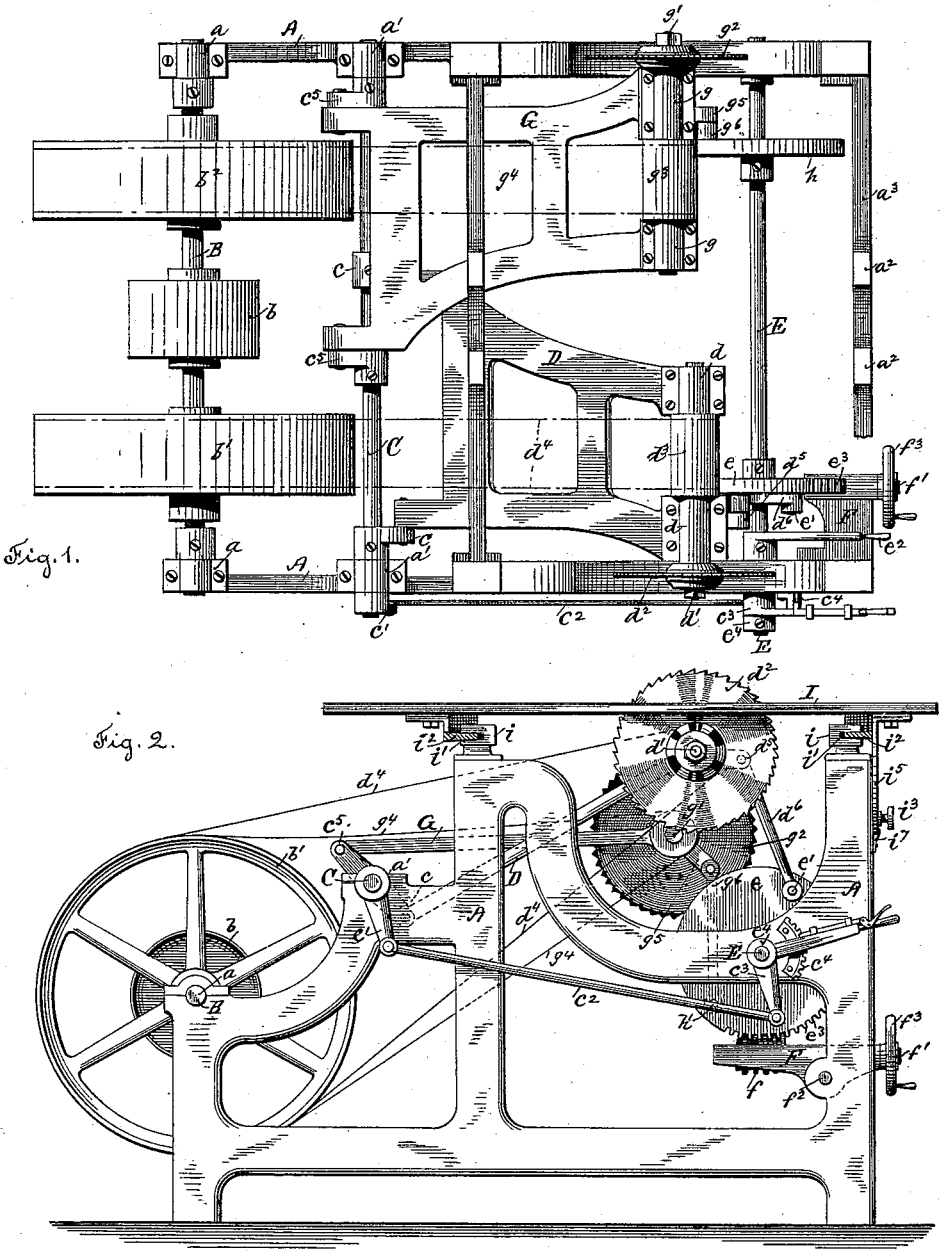

No. 468,882.   Patented Feb. 16, 1892.

Witnesses
Chas. F. Schmelz.
Jerome C. Taft

Inventor
Benjamin G. Luther
By his Attorney
S. Scholfield

UNITED STATES PATENT OFFICE.

BENJAMIN G. LUTHER, OF WORCESTER, MASSACHUSETTS.

SAWING-MACHINE.

SPECIFICATION forming part of Letters Patent No. 468,882, dated February 16, 1892.

Application filed October 17, 1890. Serial No. 368,483. (No model.)

*To all whom it may concern:*

Be it known that I, BENJAMIN G. LUTHER, a citizen of the United States, and a resident of Worcester, in the county of Worcester and State of Massachusetts, have invented certain new and useful Improvements in Sawing-Machines, of which the following is a specification.

My invention consists in the improved construction and arrangements of the parts of the machine, as hereinafter fully set forth.

Figure 3:
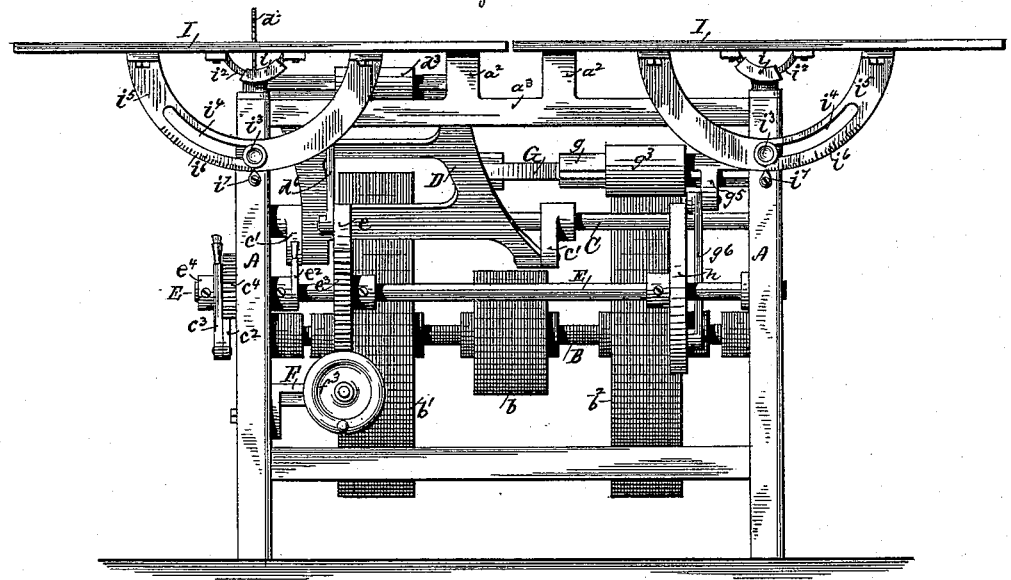
Figure 4:
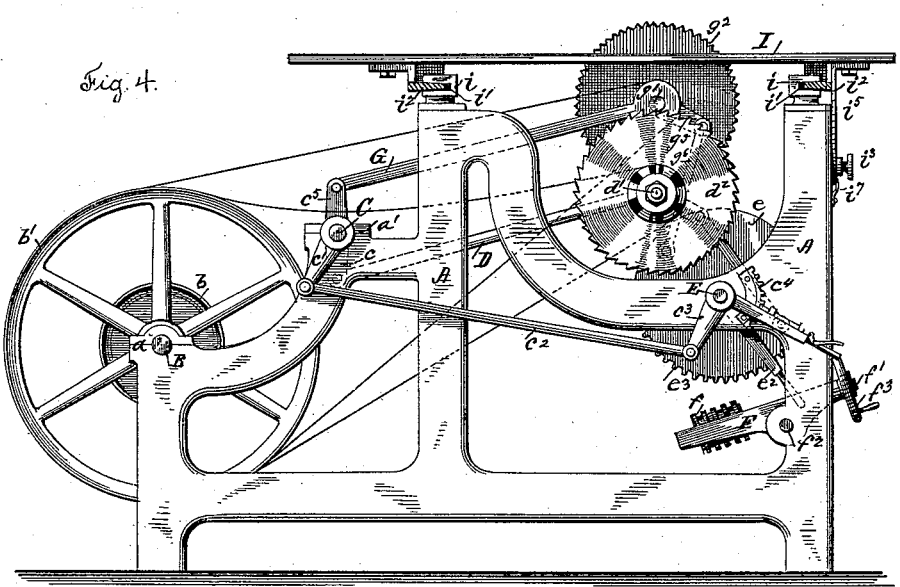

Figure 1 is a plan view of my improved machine with the tables removed. Fig. 2 is a side view of the same. Fig. 3 is an end view. Fig. 4 represents a side view showing some of the operating parts in their reversed positions.

In the drawings, A is the frame of the machine, which supports in the bearings $a$ the shaft B, which is driven by the pulley $b$, and which also carries the driving-pulleys $b'$ $b^2$, connected by belts with the pulleys on the saw-arbors. Supported in bearings $a'$ $a'$ of the frame A is a rock-shaft C, provided with a set of arms $c$, which support one end of the saw-frame D, having bearings $d$ to receive the saw-arbor $d'$, which carries the saw $d^2$ and the driving-pulley $d^3$, receiving its power through the belt $d^4$ from the pulley $b'$ above mentioned.

The front end of the saw-frame D has a lug $d^5$, which is attached to the upper end of the link or rod $d^6$, the other end of which is held by a pin $e'$ in the disk $e$. The disk $e$ is firmly secured to a shaft E, which is journaled in the frame A, and to which is attached the hand-lever $e^2$, by means of which a rocking motion may be imparted to the said shaft E. The lower portion of the periphery of the disk $e$ is provided with teeth $e^3$, thus forming a segment-gear adapted to be engaged by the worm $f$, which is supported on the spindle $f'$, having its bearings in the frame F, which is pivoted to the side frame A by a pin $f^2$, and may be swung thereon to bring the worm $f$ either into or out of engagement with the teeth $e^3$ of the disk $e$ or segment-gear. To the forward end of the spindle $f'$ is secured a hand-wheel $f^3$, by means of which rotary movement may be given to the said spindle. It will now be seen that when the worm $f$ is out of engagement with the teeth in the disk $e$ the shaft E may be rocked by the hand-lever $e^2$ to raise or lower the forward end of the saw-frame, which swings vertically around its pivot in the arms $c$ above mentioned. After the saw has been brought approximately to the desired height the frame F is to be swung around its pivot-pin $f^2$, so as to bring the worm $f$ into engagement with the teeth $e^3$ of the disk, and any fine adjustment required may then be readily made by turning the hand-wheel $f^3$ in the proper direction.

It will of course be understood that it is not necessary to disengage the worm at all from the teeth in the disk, as the latter is provided with a number of teeth sufficient to allow the saw to be raised from its lowest position below the table to the highest position above the same by the hand-wheel $f^3$; but as considerable delay would be caused in thus changing positions I prefer to disengage the worm from the teeth and then use the hand-lever to produce quick movement in reversing.

To the end of the shaft C is secured an arm $c'$, which supports one end of a rod $c^2$, the other end of which is attached to the end of the bell-crank lever $c^3$, loosely pivoted on the projecting end of the shaft E and prevented from side movement thereon by a collar $e^4$. (See Fig. 3.) The other end of the bell-crank lever $c^3$ carries a spring-actuated slide, which is adapted to engage with teeth provided in the segment $c^4$ on the frame of the machine, and which may be disengaged from the said teeth to allow the lever $c^3$ to be swung around its pivot, whereby a rocking motion will be imparted to the shaft C. This results in a forward or backward movement of the saw-frame D, and consequently in the increase or decrease of the distance between the saw-arbor $d'$ and driving-shaft B. It will therefore be understood that while the vertical adjustment of the saw is controlled by the hand-lever $e^2$ the horizontal adjustment of the same, and consequently the tightening and loosening of the belt $d^4$, is controlled by the hand-lever $c^3$.

Supported by a series of levers and arms similar to those described above is a second saw $g^2$ on the arbor $g'$, which is journaled in the bearings $g$ of the saw-frame G. The rear end of said frame is supported by the arms $c^5$ on the shaft C, while its forward end has a lug $g^5$, connected by the rod or link $g^6$ with a pin $h'$ in the disk $h$, which is firmly secured to the above-mentioned shaft E. The disk $h$ is so set on the said shaft E that while the saw $d^2$ is in its highest position the second saw $g^2$ is in its lowest, (see Fig. 2,) and vice versa, (see Fig. 4,) and as the shaft E is rocked by the hand-lever $e^2$ it will be understood that the position of both saws is controlled by the said lever at the same time. Likewise the horizontal adjustment and consequent tightening or loosening of the belt $g^4$, which connects the pulley $g^3$ with its driver $b^2$, is controlled by the above-mentioned lever $c^3$, so that when the belt $d^4$ is tightened the belt $g^4$ is loosened, and vice versa.

In the top of the frame A are pivoted the tables I in the following manner: Firmly secured to the frame are bearing-blocks $i$, provided with a tapered circular groove $i'$, adapted to receive a corresponding circular flange $i^2$, which is attached to the under side of the table and will turn in said groove around a center, which is located at the top of the table and in a line with the saw. When the tables are horizontal, they rest upon projections $a^2$, provided in the girt $a^3$, which connects the side frames A of the machine; but the tables I may be brought to an angular position with the saw, the extent of which is limited to about forty-five degrees, and held in that position by a thumb-screw $i^3$, which passes through a slot $i^4$ in the segment $i^5$ and screws into the frame A. The segment $i^5$ is fastened to the table and has near its outer edge index-marks $i^6$, which will pass the pointer $i^7$, secured to the frame when the table is being tilted, so that the latter may be readily set at any angle up to forty-five degrees with the saw and held in that position by the thumb-screw $i^3$.

The arms $c$, which support one end of the saw-frame D, and the arms $c^5$, which support the saw-frame G, may be both arranged upon the same side of the shaft C, and in that case the belts $d^4$ and $g^4$ will be tightened or loosened simultaneously, and the disks $e$ and $h$ may be so set upon the shaft E that the saws will be raised and lowered together.

I claim as my invention—

1. The combination, with the driving-shaft and a driving-pulley on said shaft, of the rock-shaft, the saw-arbor frame pivoted at its rear end to an offset arm at one side of the rock-shaft, the saw-arbor supported in the saw-arbor frame, the driving-belt for the saw-arbor, means for moving the rock-shaft to cause the tightening or loosening of the driving-belt by the resulting forward or backward movement of the saw-arbor frame, and means for raising or lowering the outer end of the saw-arbor frame to gage the cutting depth of the saw, substantially as described.

2. The combination, with the driving-shaft and the driving-pulleys on said shaft, of the rock-shaft, the saw-arbor frames pivoted the one to an offset arm at one side and the other to an offset arm at the opposite side of the rock-shaft and supported at their forward ends, the saw-arbors supported in their respective saw-arbor frames, the driving-belts for the saw-arbors, and means for moving the rock-shaft to cause the tightening of one of the driving-belts and the loosening of the other, substantially as described.

3. The combination, with a pivoted saw-arbor frame and a saw-arbor supported by said frame, of a rock-shaft provided with a crank-pin and segment-gear, a link connecting the crank-pin with the saw-arbor frame, the hand-lever attached to the rock-shaft, the pivoted frame, and the worm supported in the pivoted frame and adapted for engagement with the segment-gear and disengagement therefrom, substantially as described.

4. The combination, with the driving-shaft, a driving-pulley on said shaft, a rock-shaft, the saw-arbor frame pivoted to an offset arm upon the rock-shaft, the saw-arbor supported in the saw-arbor frame, the driving-belt for the saw-arbor, a hand-operated lever, and connections between the hand-operated lever and the rock-shaft, whereby upon the movement of the hand-operated lever a forward or backward movement will be imparted to the saw-arbor frame to cause the tightening or loosening of the driving-belt, of the rock-shaft provided with a crank-pin and segment-gear, a link connecting the crank-pin with the saw-arbor frame, the hand-lever attached to the said rock-shaft, and the worm supported in a pivoted frame and adapted for engagement with the segment-gear and disengagement therefrom, substantially as described.

BENJAMIN G. LUTHER.

Witnesses:
JOHN S. LYNCH,
SOCRATES SCHOLFIELD.